Figure 3:
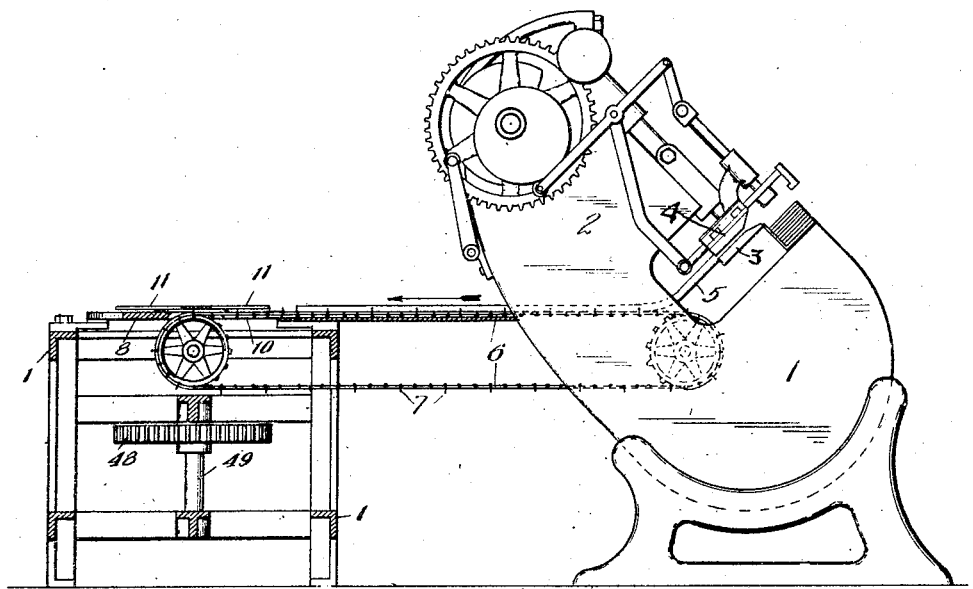

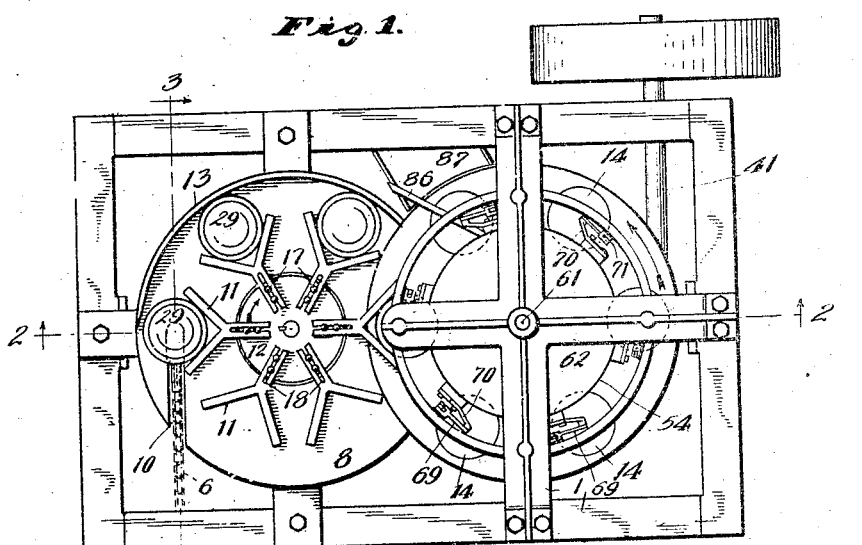

W. F. BUTLER.
CAN HEAD FLANGE CURLING AND COATING MACHINE.
APPLICATION FILED DEC. 2, 1909.

1,152,395.

Patented Sept. 7, 1915.
6 SHEETS—SHEET 2.

Witnesses
Wm. Geiger
Pearl Abrams

Inventor
William F. Butler,
By Munday Evarts Adcock & Clarke
Attorneys

W. F. BUTLER.
CAN HEAD FLANGE CURLING AND COATING MACHINE.
APPLICATION FILED DEC. 2, 1909.

1,152,395.

Patented Sept. 7, 1915.

Witnesses
Wm. Geiger
Pearl Abrams

Inventor
William F. Butler
By Munday Evarts Adcock & Clarke
Attorneys

W. F. BUTLER.
CAN HEAD FLANGE CURLING AND COATING MACHINE.
APPLICATION FILED DEC. 2, 1909.
1,152,395.
Patented Sept. 7, 1915.
6 SHEETS—SHEET 4.
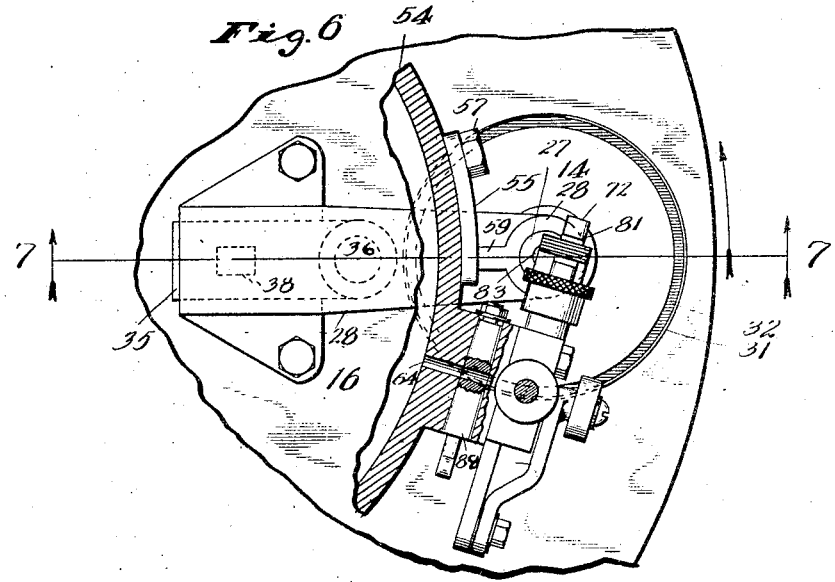
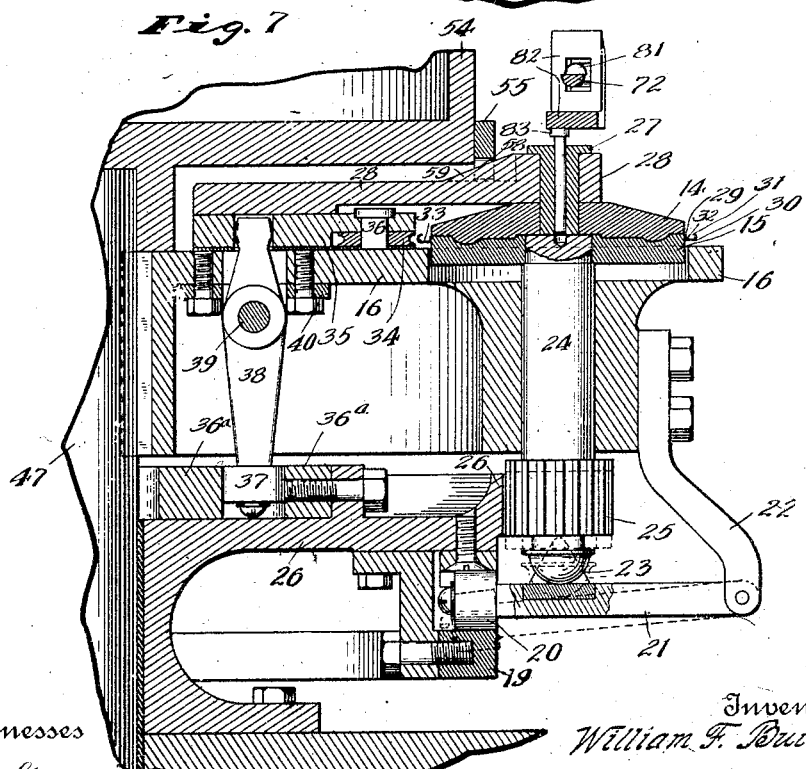
Witnesses
Wm. Geiger
Pearl Abrams.
Inventor
William F. Butler,
By Munday Evarts Adcock & Clarke
Attorneys

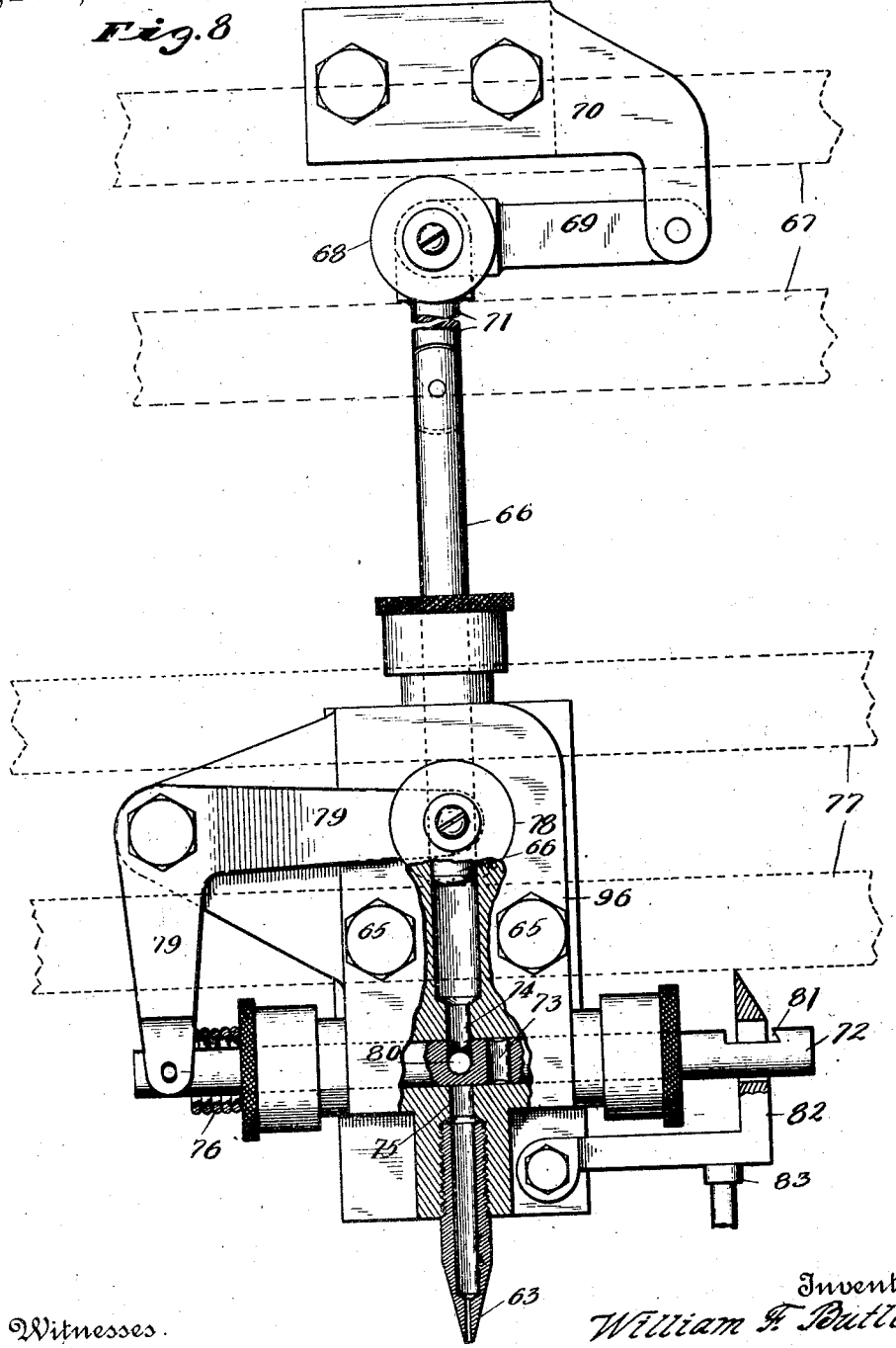

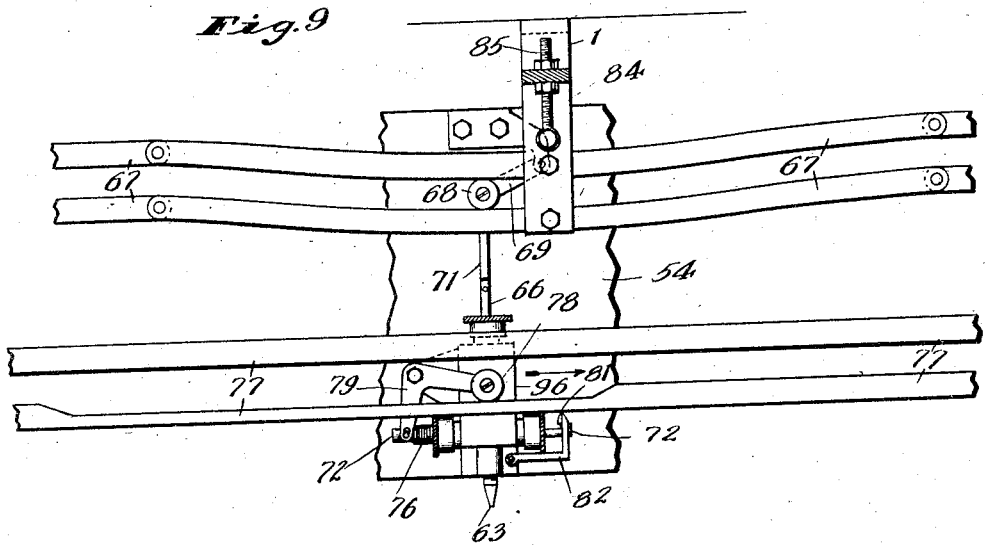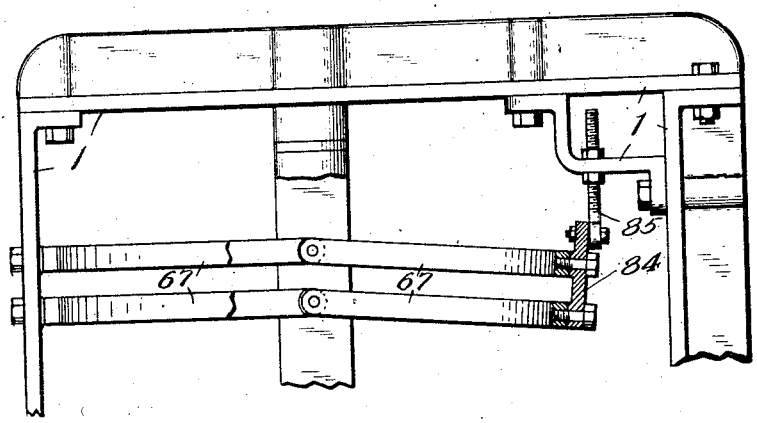

UNITED STATES PATENT OFFICE.

WILLIAM F. BUTLER, OF INDIANAPOLIS, INDIANA, ASSIGNOR TO SANITARY CAN COMPANY, OF NEW YORK, N. Y., A CORPORATION OF NEW YORK.

CAN-HEAD-FLANGE CURLING AND COATING MACHINE.

1,152,395.  Specification of Letters Patent.  Patented Sept. 7, 1915.

Application filed December 2, 1909. Serial No. 530,921.

*To all whom it may concern:*

Be it known that I, WILLIAM F. BUTLER, a citizen of the United States, residing in Indianapolis, in the county of Marion and State of Indiana, have invented a new and useful Improvement in Can-Head-Flange Curling and Coating Machines, of which the following is a specification.

My invention relates to the manufacture of can heads or covers of the kind intended to be secured to the can body without solder and simply by double seaming.

Heretofore in the manufacture of can heads or covers for double seaming to can bodies, it has been customary after the can heads or covers are stamped up or formed by the dies of the press and discharged into a basket or other receptacle, to first put them into a flange curling machine for curling the horizontal flange of the head to form a channel to receive the liquid cement or other packing, after which they are delivered to a coating machine which applies the cement or packing material to the flange of the cover in the channel formed by the flange curling machine. After the can heads have been cut and formed by the press, they frequently tend to stick or nest together, and it is a matter of considerable labor and difficulty to separate them and feed them to the flange curling machine, especially as the raw cut edges of the seaming flanges tend to cut or wear and injure the fingers in handling.

The object of my invention is to provide a combined machine of a simple, efficient and durable construction which will automatically stamp up or form the can heads or covers, curl the flanges thereof and apply the cement or packing thereto.

My invention consists in connection with a press having can head cutting and forming dies, a can head conveyer to which the can heads are delivered one by one as they are cut and formed by the press, a continuously rotating can head feeder having a plurality of can head receiving pockets or guides to which the can heads are delivered by said conveyer as they are formed by the press, a continuously rotating can head carrier having a plurality of pairs of rotary can head holders or clamping chucks between which the can heads are delivered one by one by said feeder, a plurality of flange curling tools or rollers preferably carried by radially reciprocating slides on said carrier, a cement tank or receptacle mounted on said carrier and rotating therewith, and provided with a series of feed pumps, controlling valves and discharge nozzles for the cement or packing composition, means for controlling the operation of the controlling valves by the presence or absence of a can head in the holders, a stirrer for the cement or packing composition in the tank, stationary cams and connections for operating the can head holders to clamp and unclamp the can heads as the carrier rotates and gearing for axially rotating the can head holders and operating the pumps and controlling valves as the carrier rotates.

My invention also consists in the novel construction of parts and devices and in the novel combinations and sub combinations of parts and devices herein shown and described and more particularly specified in the claims.

Figure 11:
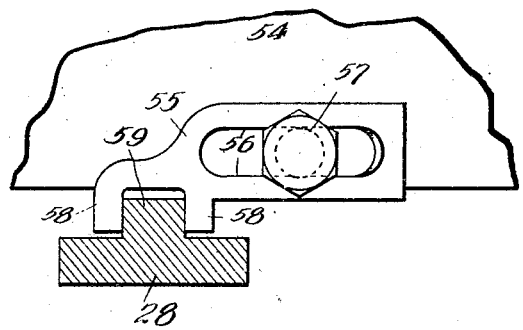
Figure 4:
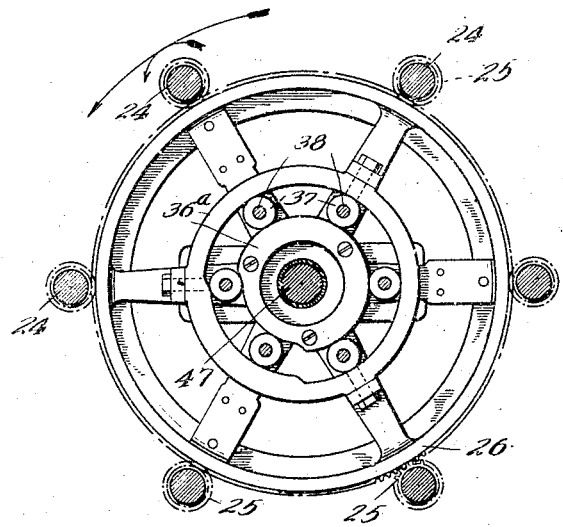
Figure 5:
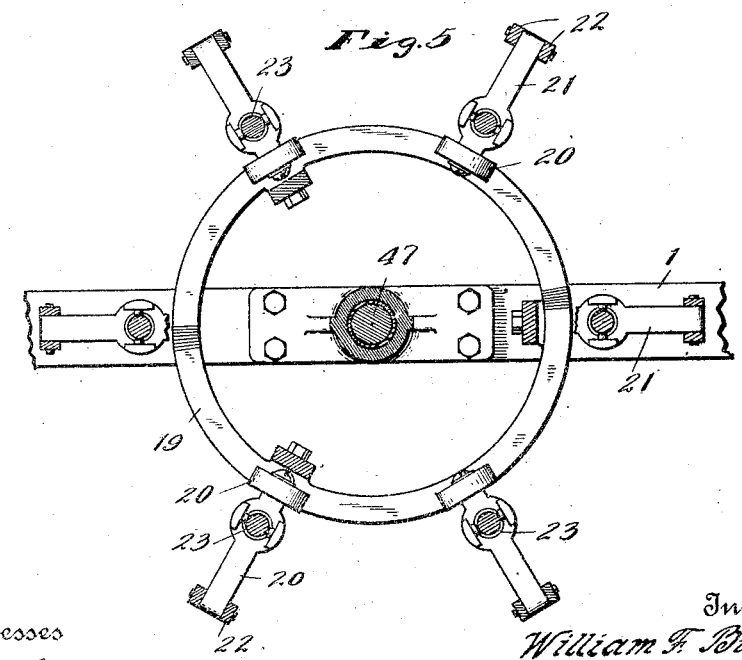

In the accompanying drawing forming a part of this specification, Figure 1 is a plan view of a machine embodying my invention, the can head cutting and forming press being only conventionally indicated. Fig. 2 is a central, vertical section on line 2—2 of Fig. 1. Fig. 3 is an elevation, partly in section on line 3—3 of Fig. 1. Figs. 4 and 5 are detail sections on lines 4—4 and 5—5 of Fig. 2 respectively. Fig. 6 is an enlarged detail plan view, partly in horizontal section, showing one of the controlling valves for one of the feed pumps. Fig. 7 is a detail vertical section on line 7—7 of Fig. 6. Fig. 8 is an enlarged elevation, partly in vertical section, showing one of the discharge nozzles and its feed pump and controlling valve. Fig. 9 is a detail elevation showing a development of the stationary cams for operating the pistons of the feed pumps and for operating the controlling valves of the discharge nozzles. Fig. 10 is a detail elevation, partly in vertical section showing the adjusting means for the stationary cams which actuate the feed pumps. Fig. 11 is a detail elevation, partly in section, showing the adjustable connection between the tank or receptacle and the rotary carrier upon which it is mounted.

In the drawing, 1 represents the frame of the machine, 2 a press of any suitable kind or construction having can head cutting and forming dies 3, 4, and discharge chute 5 which delivers the can heads as they are formed to a can head conveyer 6, preferably an endless flexible conveyer having fingers 7 to engage the can heads, said conveyer operating to move the can heads one by one onto a stationary feed table or plate 8 having a slot 10 for the fingers 7 of the conveyer 6 and deliver them one by one into the pockets or converging guides 11 of the continuously rotating can head feeder 12, which operates in conjunction with the stationary curved guard 13 to feed the can heads one by one between the upper and lower axially rotatable can holders or clamping chucks 14, 15 of the can head carrier 16. The can head receiving pockets or guides 11 are preferably adjustably secured to the carrier 12 by bolts 17 which pass through slots 18 in the pockets or guides 11 so that they may be adjusted radially in or out to accommodate can heads or covers of different diameters.

The can head carrier 16 rotates continuously in conjunction with the can head feeder 12, and it is provided preferably with six pairs of axially rotating can head holders or clamping chucks 14, 15, or one pair for each of the can head pockets 11 on the feeder 12. One of the can head holders or clamping chucks 14, 15 of each pair is adapted to be reciprocated to and from the other to clamp and unclamp the can head between them. The lower holder or chuck 15 is preferably the reciprocating one, and it is preferably reciprocated as required to clamp and unclamp the can head by means of a stationary cam 19 on the frame of the machine, in which engages a roller 20 on a lever 21 hinged to a bracket or arm 22 on the carrier 16, and which lever 21 engages the rounded end or head 23 of the spindle 24 of the lower clamp chuck 15.

One of the rotatable can head holders 14, 15, preferably the lower one, is driven, this being preferably done by spur gears 25 on the spindles 24 which mesh with a stationary gear 26 on the frame of the machine.

The upper clamping chucks or holders 14 are preferably furnished with hollow shafts or sleeves 27 which are mounted to rotate in suitable bearings or bars 28 secured to the continuously rotating can head carrier 16. Each pair of upper and lower can head holders or clamping chucks 14, 15 is shaped to conform to the central portion of the can head 29 so as to leave the flange 30 of the can head projecting beyond the periphery of the clamp chucks to enable said flange to be turned upward at its outer edge to form the curl 31, and also to enable the channel 32 thus formed by the can head flange to receive its coating 33 of liquid cement or packing composition, and to enable the can head holder chucks to properly coöperate with the discharge or distributing nozzle which feeds the packing composition onto the can head flange.

The carrier 16 is provided with a series of radially movable flange curling tools or rollers 34, each preferably mounted on or carried by a radially movable slide 35. Each flanging tool or roller 34 is rotatably connected to its slide or holder 35 by a short shaft or pin 36. Each of the radial slides 35 moves in suitable radial guides on the carrier 16. The flanging roller slides 35 are preferably reciprocated as required to cause the flanging rollers to engage the flange 30 of the can head 29 and form the curl 31 on its outer edge, by means of a stationary cam 36ª on the frame of the machine which is engaged by a roller 37 on the flanging tool operating lever 38, the upper end of which engages the slide 35 and which is fulcrumed at 39 on a bracket 40 on the carrier 16.

The horizontally rotating carrier 16 is preferably continuously rotated from the driving shaft 41 through bevel gears 42, 43, the latter being on the upright shaft 44, having a spur gear 45 which meshes with a gear 46 on the shaft 47 of the carrier 16.

The can head feeder 12 is preferably continuously rotated in conjunction with the carrier 16 by a spur gear 48 on its shaft 49 which meshes with the gear 46 on the shaft of the carrier 16.

The conveyer 6 is preferably continuously driven from the feeder shaft through a bevel gear 50 thereon, which meshes with a bevel gear 51 on the shaft 52 of the sprocket wheel 53 of the conveyer 6.

The liquid cement or packing composition is contained in a rotary tank or receptacle 54, which is preferably adjustably connected to the carrier 16 so as to rotate therewith by means of connecting brackets 55 having slots 56 to receive the bolts 57 and jaws 58 embracing the upwardly projecting rib 59 of the arms 28 on the carrier 16. The tank or receptacle 54 is preferably furnished with a stationary stirrer 60 preferably in the form of a screw blade and supported by a stem 61 attached to the frame of the machine, the stem 61 extending through the cover 62 of the tank 54. The cement tank or receptacle 54 is provided with a plurality of cement discharging or distributing nozzles 63, one for each pair of can head holders 14, 15, each nozzle communicating with the interior of the tank 54 through a communicating passage or port 64 and an interposed feed pump and controlling valve. The shell or cylinder 96 of each feed pump is preferably secured to the tank 54 by bolts 65 and its piston 66, which is preferably a reciprocating one, is operated as required to force the required amount of liquid cement or packing composition upon each can head clamped in the holders 14, 15, preferably by means of a stationary cam 67 on the frame of the machine which is engaged by a roller 68 on a lever 69, pivoted to a bracket 70 on the rotating carrier 16 or its tank 54 which rotates therewith, and which lever 69 is pivotally connected with the stem 71 of the piston.

The controlling valve 72 is preferably a reciprocating one and has a port 73 adapted to register with the ports 74, 75 of the valve shell, which is preferably integral with the pump cylinder or shell, and is reciprocated as required to open and close the valve, through an interposed spring 76, by a stationary cam 77 on the frame of the machine, which is engaged by a roller 78 on a lever 79, pivoted to the rotary carrier 16 or its tank 54, and having an arm which is pivotally connected with the valve 72. The valve 72 has a return port or passage 80 to permit the liquid to return to the chamber of the pump cylinder when the pump piston makes a stroke while the controlling valve is not open. The controlling valve 72 has a notch or projection 81 adapted to be engaged by a controlling device or movable trigger 82, the trigger or controlling device 82 being normally held out of engagement with the valve 72, as shown in Fig. 8 whenever a can head is present in the axially rotatable holders 14, 15 of the carrier to receive the charge of cement or packing composition. When no can head is present on the holders 14, 15, the trigger 82 will drop into position to lock the valve 72 from movement and the roller 78 on the lever 79 will be retained in its uppermost position, or in other words, in engagement with the upper member of the cam guide-way 77. Ordinarily when a can head is present, the roller 78 will drop by gravity, assisted by the spring 76 when the roller 78 passes over the cut out portion of the lower member of the cam 77. The controlling device or trigger 82 is thus operated preferably by means of a reciprocating pin 83 in the hollow shaft or sleeve 27 of the upper can head holder or clamping disk 14, the lower end of which pin is engaged by the can head 29 if one is present in the holders 14, 15, thus raising the pin and causing it in turn to raise the trigger or valve-controlling device 82.

The stationary cam 67 is preferably composed of flexible rails, as shown in Fig. 9 so that the same may be adjusted up or down to regulate the stroke of the feed piston through the connecting strap 84 and adjusting screw 85.

As the construction and operation of can head or cover cutting and forming presses and their dies is well known to those skilled in the art, it is unnecessary to particularly show or describe the same.

After the can heads have been operated upon by the curling rollers and by the flange coating nozzles or devices, they are discharged from the axially rotatable can head holders on the carrier by means of an ejector 86, preferably in the form of a stationary arm, projecting into the path of the can heads on the carrier which engages and frees the can heads from the lower can head holder chucks and delivers them into the discharge chute 87.

The lower can head holder chucks 15 are moved upward by the operation of the stationary cam 19 just as each can head pocket 11 on the feeder 12 comes radially opposite the can head holder 15 on the carrier 16, the chuck disk 15 thus lifting the can head above the converging guides or pockets 11 of the feeder and thereby transferring each can head from the continuously rotating feeder 12 to the continuously rotating carrier 16.

Hand operated valves 88 are preferably provided for closing the passages 64 when desired for repairs or other purposes.

I claim:—

1. In a machine for curling can heads and applying cement thereto, the combination of a continuously rotating can head feeder having a plurality of can head receiving pockets, a continuously rotating can head carrier having a plurality of pairs of axially rotatable can head holder chucks, a plurality of flange curling rollers mounted on said carrier, one for each pair of can holder chucks, a tank mounted on said carrier, a plurality of distributing nozzles on said carrier and communicating with said tank, a plurality of feed pumps, one for each nozzle, and a plurality of controlling valves, one for each nozzle, substantially as specified.

2. In a machine for curling can heads and applying cement thereto, the combination of a continuously rotating can head feeder having a plurality of can head receiving pockets, a continuously rotating can head carrier, having a plurality of pairs of axially rotatable can head holder chucks, a plurality of flange curling rollers mounted on said carrier, one for each pair of can holder chucks, a tank mounted on said carrier, a plurality of distributing nozzles on said carrier and communicating with said tank, a plurality of feed pumps, one for each nozzle, and a plurality of controlling valves, one for each nozzle, and a can head ejector device and discharge chute, substantially as specified.

3. In a machine for curling can heads and applying cement thereto, the combination of a continuously rotating can head feeder having a plurality of can head receiving pockets, a continuously rotating can head carrier having a plurality of pairs of axially rotatable can head holder chucks, a plurality of flange curling rollers mounted on said carrier, one for each pair of can holder chucks, a tank mounted on said carrier, a plurality of distributing nozzles on said carrier and communicating with said tank, a plurality of feed pumps, one for each nozzle, a plurality of controlling valves, one for each nozzle, and a stationary cam for reciprocating the lower can holder chucks, substantially as specified.

4. In a machine for curling can heads and applying cement thereto, the combination of a continuously rotating can head feeder having a plurality of can head receiving pockets, a continuously rotating can head carrier having a plurality of pairs of axially rotatable can head holder chucks, a plurality of flange curling rollers mounted on said carrier, one for each pair of can holder chucks, a tank mounted on said carrier, a plurality of distributing nozzles on said carrier and communicating with said tank, a plurality of feed pumps, one for each nozzle, a plurality of controlling valves, one for each nozzle, and a stationary cam for reciprocating the lower can holder chucks, the spindles of the lower chucks of each pair having gears, and a stationary gear meshing therewith to rotate said can holder chucks, substantially as specified.

5. In a machine for curling can heads and applying cement thereto, the combination of a continuously rotating can head feeder having a plurality of can head receiving pockets, a continuously rotating can head carrier having a plurality of pairs of axially rotatable can head holder chucks, a plurality of flange curling rollers mounted on said carrier, one for each pair of can holder chucks, a tank mounted on said carrier, a plurality of distributing nozzles on said carrier and communicating with said tank, a plurality of feed pumps, one for each nozzle, a plurality of controlling valves, one for each nozzle, and a stationary cam for operating said pumps as the carrier rotates, substantially as specified.

6. In a machine for curling can heads and applying cement thereto, the combination of a continuously rotating can head feeder having a plurality of can head receiving pockets, a continuously rotating can head carrier having a plurality of pairs of axially rotatable can head holder chucks, a plurality of flange curling rollers mounted on said carrier, one for each pair of can holder chucks, a tank mounted on said carrier, a plurality of distributing nozzles on said carrier and communicating with said tank, a plurality of feed pumps, one for each nozzle, a plurality of controlling valves, one for each nozzle and a stationary cam for operating said controlling valves as the carrier rotates, substantially as specified.

7. In a machine of the character described, in combination: a carrier rotatable about a vertical axis; a plurality of sets of can head clamping and holding chucks, each set comprising two alined axially rotatable members, the lower of which is reciprocatingly mounted and movable in a recess in the carrier, said holders being adapted to clamp and engage a can head and leave the seam-forming flange exposed; a plurality of radially reciprocating slides mounted on said carrier, each slide having a curling roll thereon adapted to engage and curl a can end flange held by said holders; and mechanism for rotating said carrier and said lower ones of each set of holders, substantially as specified.

8. A can head lining machine having, in combination, upper and lower rotatable members between which the can end is adapted to be gripped and rotated, means for feeding can ends successively between the said rotatable members, means for forcing one member toward the other member to clamp the can end, means for rotating one of said members, a nozzle for delivering liquid lining material or composition on the can end, a passage for supplying lining material to the nozzle, a reciprocating member concentric with one of said rotatable members and adapted to be moved by a can end, and means whereby the movement of the said reciprocating member causes the delivery of lining material by the said nozzle.

9. A machine of the character described including, in combination: a carrier rotatable about a vertical axis; a plurality of sets of can head holders mounted on said carrier, said holders being axially rotatable and each set comprising a relatively stationary upper holder and reciprocating lower holder, the latter being movable in a recess in the carrier; a plurality of can head flange curling rollers mounted on said carrier and corresponding in number to the number of said sets of holders; and mechanism for rotating and reciprocating the lower holders of each set, substantially as specified.

10. The combination with a carrier having a plurality of pairs of can head holder chucks, of a plurality of can-head-flange curling rollers mounted on said carrier, a tank mounted on and rotating with said carrier and a plurality of discharge nozzles communicating with said tank, substantially as specified.

11. The combination with a carrier having a plurality of pairs of can head holder chucks, of a plurality of can head flange curling rollers mounted on said carrier, a tank mounted on and rotating with said carrier, a plurality of discharge nozzles communicating with said tank and controlling valves, one for each of said discharge nozzles, substantially as specified.

12. The combination with a carrier having a plurality of pairs of can head holder chucks, of a plurality of can-head-flange curling rollers mounted on said carrier, a tank mounted on and rotating with said carrier, a plurality of discharge nozzles communicating with said tank, and feed pumps, one for each of said discharge nozzles, substantially as specified.

13. The combination with a carrier having a plurality of pairs of can head holder chucks, of a plurality of can-head-flange curling rollers mounted on said carrier, a tank mounted on and rotating with said carrier, a plurality of discharge nozzles communicating with said tank, feed pumps, one for each of said discharge nozzles, and controlling valves, one for each of said discharge nozzles, substantially as specified.

14. The combination with a rotating carrier having a plurality of pairs of rotary can-head holder chucks, of a plurality of flange curling rollers on said carrier, one for each pair of chucks, a tank mounted on said carrier and rotating therewith, a plurality of discharge nozzles communicating with said tank, a controlling valve for each discharge nozzle and a feed pump for each discharge nozzle, substantially as specified.

15. The combination with a rotating carrier having a plurality of pairs of rotary can-head holder chucks, of a plurality of flange curling rollers on said carrier, one for each pair of chucks, a tank mounted on said carrier and rotating therewith, a plurality of discharge nozzles communicating with said tank, a controlling valve for each discharge nozzle, a feed pump for each discharge nozzle, and a rotary feeder having a plurality of can head receiving pockets for feeding the can heads to said carrier, substantially as specified.

16. The combination with a rotating carrier having a plurality of pairs of rotary can-head holder chucks, of a plurality of flange curling rollers on said carrier, one for each pair of chucks, a tank mounted on said carrier and rotating therewith, a plurality of discharge nozzles communicating with said tank, a controlling valve for each discharge nozzle, a feed pump for each discharge nozzle, a rotary feeder having a plurality of can head receiving pockets for feeding the can heads to said carrier and a conveyer for delivering the can heads to said feeder, substantially as specified.

17. The combination with a rotating carrier having a plurality of pairs of rotary can-head holder chucks, of a plurality of flange curling rollers on said carrier, one for each pair of chucks, a tank mounted on said carrier and rotating therewith, a plurality of discharge nozzles communicating with said tank, a controlling valve for each discharge nozzle, a feed pump for each discharge nozzle, a rotary feeder having a plurality of can head receiving pockets for feeding the can heads to said carrier and a conveyer for delivering the can heads to said feeder, substantially as specified.

18. The combination with a rotating carrier, having a plurality of pairs of rotary can-head holder chucks, of a plurality of flange curling rollers on said carrier, one for each pair of chucks, a tank mounted on said carrier and rotating therewith, a plurality of discharge nozzles communicating with said tank, a controlling valve for each discharge nozzle, a feed pump for each discharge nozzle, and a stationary cam for operating said pumps as the carrier rotates, substantially as specified.

19. The combination with a rotating carrier having a plurality of pairs of rotary can-head holder chucks, of a plurality of flange curling rollers on said carrier, one for each pair of chucks, a tank mounted on said carrier and rotating therewith, a plurality of discharge nozzles communicating with said tank, a controlling valve for each discharge nozzle, a feed pump for each discharge nozzle, and a stationary cam for operating said valves as the carrier rotates, substantially as specified.

20. The combination with a rotating carrier, having a plurality of pairs of rotary can-head holder chucks, of a plurality of flange curling rollers on said carrier, one for each pair of chucks, a tank mounted on said carrier and rotating therewith, a plurality of discharge nozzles communicating with said tank, a controlling valve for each discharge nozzle, a feed pump for each discharge nozzle, and a stationary cam for reciprocating one of the can head holder chucks of each pair as the carrier rotates, substantially as specified.

21. The combination with a rotating carrier having a plurality of pairs of rotary can-head holder chucks, of a plurality of flange curling rollers on said carrier, one for each pair of chucks, a tank mounted on said carrier and rotating therewith, a plurality of discharge nozzles communicating with said tank, a controlling valve for each discharge nozzle, a feed pump for each discharge nozzle, and a stationary cam for operating said flange curling rollers as the carrier rotates, substantially as specified.

22. The combination with a rotating carrier having a plurality of pairs of rotary can head holder chucks, of a plurality of flange curling rollers on said carrier, one for each pair of chucks, a tank mounted on said carrier and rotating therewith, a plurality of discharge nozzles communicating with said tank, a controlling valve for each discharge nozzle, a feed pump for each discharge nozzle and means for controlling the operation of said valves by the presence or absence of a can head on said holder chucks, substantially as specified.

23. The combination with a carrier having a plurality of pairs of rotatable can-head holder chucks thereon adapted to engage and clamp between them the opposite faces of a can head within its seam flange and leave the seam flange peripherally projecting from said chucks, of a tank mounted on and rotating with said carrier and having a plurality of discharge nozzles communicating with said tank, substantially as specified.

24. The combination with a carrier having a plurality of pairs of rotatable can-head holder chucks thereon adapted to engage and clamp between them the opposite faces of a can head within its seam flange and leave the seam flange peripherally projecting from said chucks, of a tank mounted on and rotating with said carrier and having a plurality of discharge nozzles communicating with said tank, and a plurality of controlling valves, one for each of said discharge nozzles, substantially as specified.

25. The combination with a carrier having a plurality of pairs of rotatable can-head holder chucks thereon adapted to engage and clamp between them the opposite faces of a can head within its seam flange and leave the seam flange peripherally projecting from said chucks, of a tank mounted on and rotating with said carrier and having a plurality of discharge nozzles communicating with said tank, a plurality of controlling valves, one for each of said discharge nozzles, and means for controlling the operation of said valves by the presence or absence of can heads on said holder chucks, substantially as specified.

26. The combination with a carrier having a plurality of pairs of rotatable can-head holder chucks thereon adapted to engage and clamp between them the opposite faces of a can head within its seam flange and leave the seam flange peripherally projecting from said chucks, of a tank mounted on and rotating with said carrier and having a plurality of discharge nozzles communicating with said tank, a plurality of controlling valves, one for each of said discharge nozzles and a feed pump for each of said discharge nozzles, substantially as specified.

27. The combination with a pair of rotatable can head holder chucks adapted to engage and clamp between them the opposite faces of a can head within its seam flange and leave the seam flange peripherally projecting from said chucks, of means for opening and closing said chucks, means for rotating said chucks, a movable flange curling device coöperating therewith and a flange cement coating nozzle, substantially as specified.

28. The combination with rotary can-head holder chucks, of a movable flange curling roller, a tank and a distributing nozzle communicating with said tank, substantially as specified.

29. The combination with rotatable can-head holder chucks, of a movable flange curling roller, a tank, a distributing nozzle communicating with said tank and a feed pump, substantially as specified.

30. The combination with rotatable can head holder chucks, of a movable flange curling roller, a tank, a distributing nozzle communicating with said tank, a feed pump and a controlling valve for said nozzle, substantially as specified.

31. The combination with rotatable can-head holder chucks, of a movable flange curling roller, a tank, a distributing nozzle communicating with said tank, a feed pump, a controlling valve for said nozzle, and means for controlling the operation of said valve by the presence or absence of a can head on the can holder chucks, substantially as specified.

32. The combination with a pair of rotatable can-head holder chucks, of a flange curling roller, a tank, a distributing nozzle and valve, and means for controlling the operation of said valve by the presence or absence of a can head on the holder chuck, substantially as specified.

33. The combination with a pair of rotatable can-head holder chucks, of a flange curling roller, a tank, a distributing nozzle and valve, and means for controlling the operation of said valve by the presence or absence of a can head on the holder chuck, and a feed pump, substantially as specified.

34. The combination with a pair of rotatable can head holder chucks, of a flange curling roller, a tank, a distributing nozzle and valve, means for controlling the operation of said valve by the presence or absence of a can head on the holder chuck, a feed pump, and a stirrer in said tank, substantially as specified.

35. The combination with a pair of rotatable can head holder chucks adapted to engage and clamp between them the opposite faces of a can head within its seam flange and leave the seam flange peripherally projecting from said chucks, of a flange curling device and a flange coating device and a can head feeder, substantially as specified.

36. The combination with a carrier, of a plurality of pairs of rotatable can-head holder chucks thereon, a plurality of flange curlers on said carrier, a tank mounted on and rotating with said carrier and a plurality of discharge nozzles communicating with said tank, substantially as specified.

37. The combination with a carrier, of a plurality of pairs of rotatable can-head holder chucks thereon, a plurality of flange curlers on said carrier, a tank mounted on and rotating with said carrier and a plurality of discharge nozzles communicating with said tank, and a feeder, substantially as specified.

38. The combination with a carrier, of a plurality of pairs of rotatable can head holder chucks thereon, a plurality of flange curlers on said carrier, a tank mounted on and rotating with said carrier, a plurality of discharge nozzles communicating with said tank, and a rotary feeder having a plurality of can head receiving pockets, substantially as specified.

39. The combination with a carrier, of a plurality of pairs of rotatable can head holder chucks thereon, a plurality of flange curlers on said carrier, a tank mounted on and rotating with said carrier, a plurality of discharge nozzles communicating with said tank, a rotary feeder having a plurality of can head receiving pockets and a plurality of feed pumps, one for each of said nozzles, substantially as specified.

40. The combination with a carrier, of a plurality of pairs of rotatable can-head holder chucks thereon, a plurality of flange curlers on said carrier, a tank mounted on and rotating with said carrier, a plurality of discharge nozzles communicating with said tank, a rotary feeder having a plurality of can head receiving pockets, a plurality of feed pumps, one for each of said nozzles, and a plurality of controlling valves, one for each of said nozzles, substantially as specified.

41. The combination with a carrier, of a plurality of pairs of rotatable can-head holder chucks thereon, a plurality of flange curlers on said carrier, a tank mounted on and rotating with said carrier, a plurality of discharge nozzles communicating with said tank, a rotary feeder having a plurality of can head receiving pockets, a plurality of feed pumps, one for each of said nozzles, a plurality of controlling valves, one for each of said nozzles, and a conveyer for delivering the can heads to said feeder, substantially as specified.

42. The combination with a carrier, of a plurality of pairs of rotatable can-head holder chucks thereon, a plurality of flange curlers on said carrier, a tank mounted on and rotating with said carrier, a plurality of discharge nozzles communicating with said tank, a rotary feeder having a plurality of can head receiving pockets, a plurality of feed pumps, one for each of said nozzles, a plurality of controlling valves one for each of said nozzles, and means for controlling the operation of said valves by the presence or absence of can heads on said holder chucks, substantially as specified.

43. The combination of a rotary carrier having a plurality of axially rotatable can head holders, a plurality of can head curling devices, on said carrier, a tank on said carrier and a plurality of distributing nozzles mounted on said carrier and communicating with said tank, substantially as specified.

44. The combination of a rotary carrier having a plurality of axially rotatable can head holders, a plurality of can head curling devices on said carrier, a tank on said carrier and a plurality of distributing nozzles mounted on said carrier and communicating with said tank, and a plurality of feed pumps, one for each of said nozzles, substantially as specified.

45. The combination with a rotary carrier having a plurality of axially rotatable can head holders, a plurality of can head curling devices on said carrier, a tank on said carrier and a plurality of distributing nozzles mounted on said carrier and communicating with said tank, a plurality of feed pumps, one for each of said nozzles, and a plurality of controlling valves, one for each of said nozzles, substantially as specified.

46. The combination with a rotary carrier having a plurality of axially rotatable can head holders, a plurality of can head curling devices on said carrier, a tank on said carrier and a plurality of distributing nozzles mounted on said carrier and communicating with said tank, a plurality of feed pumps, one for each of said nozzles, a plurality of controlling valves, one for each of said nozzles, and a plurality of triggers for locking said controlling valves against opening, substantially as specified.

47. The combination with a rotary carrier having a plurality of axially rotatable can head holders, a plurality of can head curling devices on said carrier, a tank on said carrier and a plurality of distributing nozzles mounted on said carrier and communicating with said tank, a plurality of feed pumps, one for each of said nozzles, a plurality of controlling valves, one for each of said nozzles, a plurality of triggers for locking said controlling valves against opening, and connecting means adapted to engage the can heads on said can head holders, to move said triggers into position to permit the controlling valves to operate, substantially as specified.

48. A machine for bending the edges of can heads, provided with a mandrel mounted to turn and fitting into the can head, a clamping head adapted to engage the top of the can head to press the latter in contact with the mandrel and thus cause the can head to revolve with the mandrel, a roller adapted to engage the edge of the can head laterally to bend the edge, a nozzle connected with a packing material supply and extending over the can head flange, a valve in the said nozzle, and means controlled by the said clamping head to periodically open the said valve.

49. A can head lining machine having, in combination, upper and lower rotatable members between which the can end is adapted to be gripped and rotated, means for feeding can ends successively between the said rotatable members, means for forcing one member toward the other member to clamp the can end, means for rotating one of said members, a nozzle for delivering liquid lining material or composition to the exposed marginal portion of the can end, a passage for supplying lining material to the nozzle, a reciprocating member concentric with one of said rotatable members and adapted to be moved by a can end, and a valve for cutting off the flow of lining material, which valve is caused to open when the said reciprocating member is moved by a can end.

50. A can head lining machine having, in combination, upper and lower rotatable members between which the can end is adapted to be gripped and rotated, means for feeding can ends successively between the said rotatable members, means for forcing one member toward the other member to clamp the can end, means for rotating one of said members, a nozzle for delivering liquid lining material or composition on the can end, a passage for supplying lining material to the nozzle, a reciprocating member concentric with one of said rotatable members and adapted to be moved by a can end, a valve for cutting off the flow of lining material, and a spring for opening the said valve, which spring is caused to operate when the said reciprocating member is moved by a can end.

51. A can head lining machine having, in combination, upper and lower rotatable members between which the can end is adapted to be gripped and rotated, means for feeding can ends successively between the said rotatable members, means for forcing the lower member toward the other member to clamp the can end, means for rotating one of said members the other member being rotated by the friction of the can end, an eccentric nozzle for delivering liquid lining material or composition to the exposed marginal portion of the can end, a passage for supplying lining material to the nozzle, a reciprocating member concentric with the upper rotatable member and adapted to be forced up by a can end, a valve for cutting off the flow of lining material, and a spring for opening the said valve, which spring is caused to operate when the said reciprocating member is raised by a can end.

52. In a can head lining machine, upper and lower chuck members between which the can end is adapted to be gripped and rotated, an eccentric means for depositing a coating on the can end, a reciprocating member concentric with one of the said chuck members and adapted to be moved by the can end relative to the said chuck member, and means whereby the movement of the said reciprocating member causes the operation of the said depositing means.

WILLIAM F. BUTLER.

Witnesses:
O. T. DAY,
T. E. BRADSHAW.